United States Patent [19]

Iwatani

[11] 4,178,251

[45] Dec. 11, 1979

[54] APPARATUS FOR DEHYDRATION OF SLUDGE

[75] Inventor: Akitoshi Iwatani, Marugame, Japan

[73] Assignee: Ishigaki Kiko Co., Ltd., Tokyo, Japan

[21] Appl. No.: 935,696

[22] Filed: Aug. 21, 1978

[30] Foreign Application Priority Data

Dec. 20, 1977 [JP] Japan ............................... 52-153719

[51] Int. Cl.[2] ............................................ B01D 33/04

[52] U.S. Cl. .................................. 210/350; 100/118; 162/205; 162/360 R; 210/401

[58] Field of Search ........................ 210/400, 401, 350; 162/205, 360 R; 34/111, 116–118, 162; 100/151–154, 118–120

[56] References Cited

U.S. PATENT DOCUMENTS 3,797,384 3/1974 Hoff ................................ 162/360 R

*Primary Examiner*—Frank Sever

[57] ABSTRACT

Sludge like sewage sludge is fed at the beginning of a path of travel of two endless belts of filter material. The sludge, carried between the two endless belts, is compressed and dehydrated between a drum which is supported in bearings with its periphery in contact with one of the endless belts and pressure belts which are trained around a plurality of rolls and brought into contact with the other of the endless belts. The pressure belts are composed of a multiplicity of narrow belts. Pressing by individual pressure belts is applied to the endless filter material belts at a suitable number of stages into which the path of the filter material belts is divided. Preferably, pressure is exerted on the sludge by a smaller number of pressure belts at early pressing stage and by a larger number of pressure belts at later pressing stages.

13 Claims, 23 Drawing Figures

APPARATUS FOR DEHYDRATION OF SLUDGE

BACKGROUND AND SUMMARY

This invention relates to a method and apparatus for dehydrating sludge such as sewage sludge.

It is well known that sludge produced in sewage treatmentplants are fed to a belt screen press for dehydration after organic and/or inorganic additives are added thereto to accelerate the coagulation thereof.

In a well-known belt screen press, sludge is fed on the portion of a water-permeable endless belt which is arranged on a horizontal plane by being trained around a plurality of guide rolls and which is not subjected to pressure and are dehydrated by gravity acting thereon. The sludge is then carried between said endless belt and another endless belt trained around another set of guide rolls to be guided to run in contiguous relation with the first mentioned endless belt. The sludge so carried between the two endless belts is compressed betwen one or more pairs of compression rolls which are disposed in opposed relation so as to permit the endless belts to pass between them in immediate contact relation therewith. In another well-known method, sludge is compressed between a drum which is supported in suitable bearings, with its periphery in immediate contact with one of the two endless belts, and a pressure belt which is trained around aplurality of rolls, with its surface in immediate contact with the other of the two endless belts, compression pressure being exerted over the portion of the two endless belts carrying sludges therebetween which surrounds the drum interposedly between the drum and the pressure belt.

This invention relates more specifically to the latter mentioned method, or more concretely, a method wherein sludge is fed into the first section of a path of travel of two endless belts, each trained around a plurality of guide rolls, and which are caused to run along said path of travel in contiguous relation with each other, at least one of said two endless belts being made of water permeable filter medium, and said sludge, carried between said two endless belts, is compressed to be dehydrated by and between a drum which is supported in suitable bearings, with its periphery in immediate contact with one of the two endless belts, and a pressure belt which is trained around a plurality of rolls, with its surface in immediate contact with the other of the two endless belts, and an improvement thereof.

Patent disclosures dealing with dehydrating apparatuses of this type are found in Japanese Patent Application Disclosure No. 123964 of 1976 and Japanese Utility Model Application Disclosure No. 104172 of 1977.

In these dehydrators of belt press type, the pressure belt which is in immediate contact with one of the endless belts exerts pressure upon at least one of the endless belts against the drum, as it is tensioned, so that the sludge carried between the endless belts is heavily compressed by the pressing pressure caused between the endless belt and the drum and not through the tension of the endless belts. Therefore, the water-permeable endless belts between which the sludge is carried need not be subjected to any unreasonable tension. This is an advantage in that the seam of the endless belt is less likely to break due to tension. Another advantage of dehydrators of this type is that the sludge-carrying portion of the endless belt undergoes surface compression in the course of its passage between the pressure belt and the drum, whereby a high dehydration rate is assured.

As disclosed in Japanese Patent Application Disclosure No. 128964 of 1976, a pressure belt composed of multiple belt strips is found to be advantageous: a multiplicity of belt strips pressing the outer water-permeable webs which surround the drum are traversely spaced apart from one another. This arrangement shows good dehydration results.

However, in these prior art apparatuses, consideration is not given as to how to apply surface pressure. Where the run of the pressure belt around the drum is small, e.g., 90° or less in terms of angle of contact, pressure loading toward drum surface due to the tension of the pressure belt is not so variable because curvature between the beginning point and the ending point of contact is small. In this case, no problem is involved. On the other hand, if the run of the pressure belt around the drum is 180° or more, for example, in terms of angle of contact, pressure loading differs substantially between the beginning or ending points (smallest) and the middle contact point (largest) because curvature is large. This means that the pressure belt serves substantially for dehydration during the first half of its run but does not function well during the latter half of its run.

In conventional press-type dehydrators, the pressure belt is in contact with the sludge-carrying endless belts, with the same pressing coverage throughout its run. As soon as sludge enters the pressing zone, abrupt compression pressure is exerted thereupon, and consequently mesh clogging is often caused to water permeable endless belts at an early stage of pressing operation. Thus, the water penetrability is reduced and the subsequent dehydrating operation does not progress smoothly for the amount of pressure effected.

Such problem involved in prior art belt press filters has not been known. A solution to this problem is also required. Therefore, it is an object of this invention to provide a method and apparatus for smoother and more efficient dehydrating operation.

More specifically, it is proposed that in a method for sludge dehydration using belt press type apparatus as mentioned above, a pressure belt is composed of a plurality of belt strips, the path of travel of the endless belts around the drum being divided into a plurality of stages, pressing of sludge by pressure belts being applied at traversely spaced positions, stage by stage, by alternating and/or increasing such positions.

Figure 1:
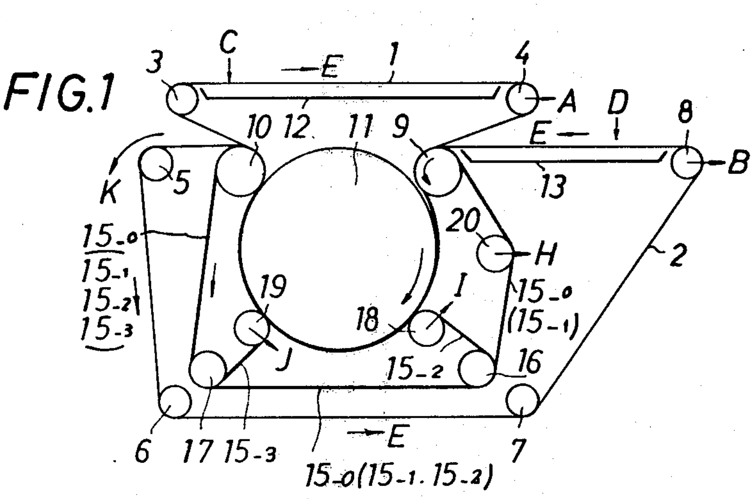
FIG. 1 is a side view showing schematically a dehydrating apparatus embodying this invention.
Figure 3:
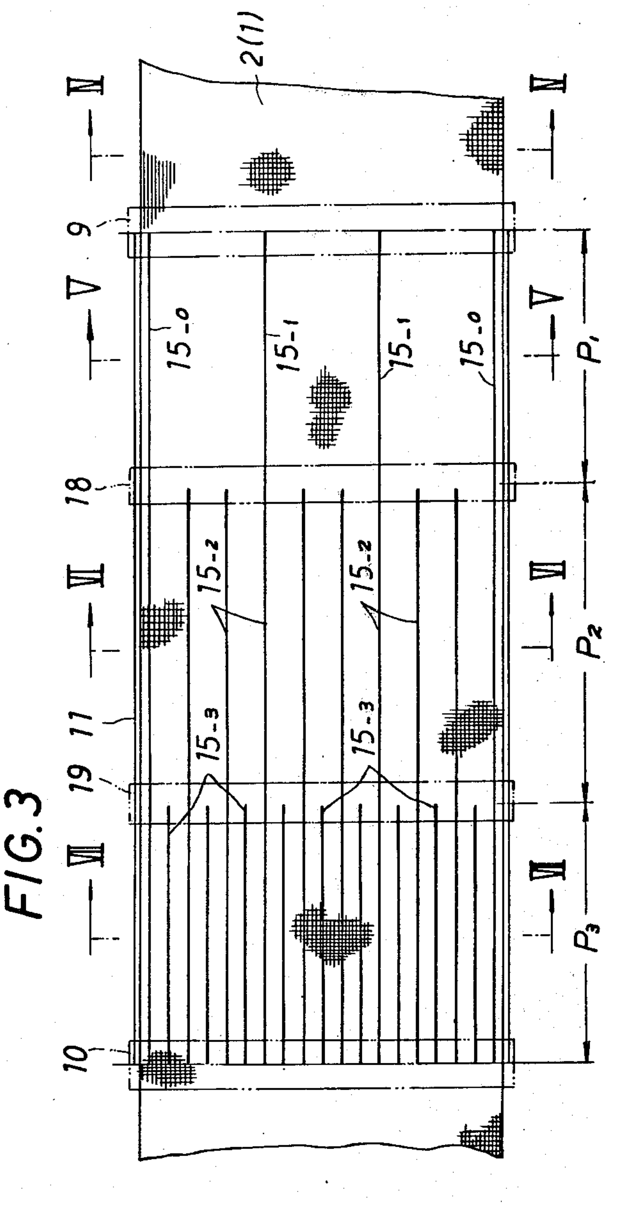
Figures 4, 5, 6, 7:
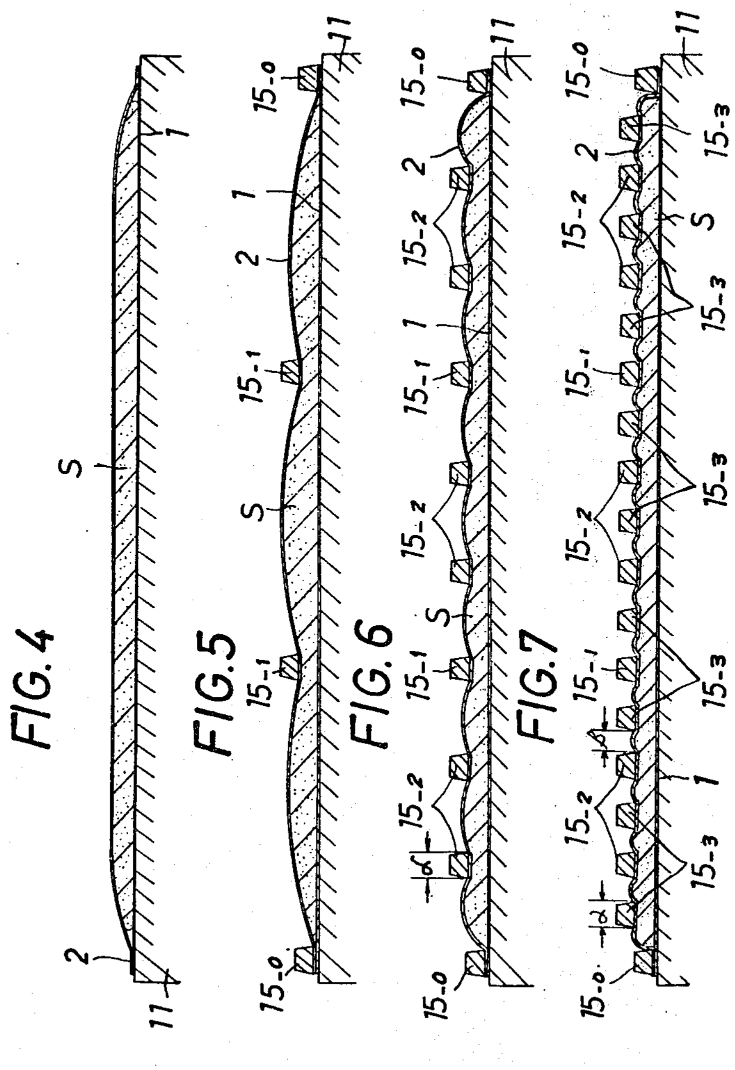
Figure 8:
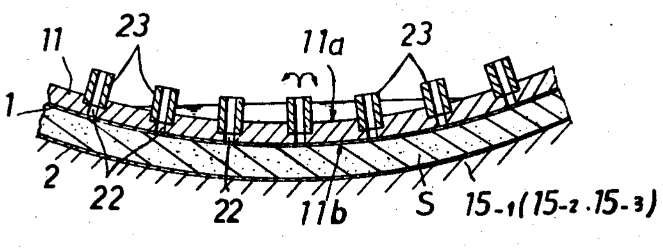
Figure 12:
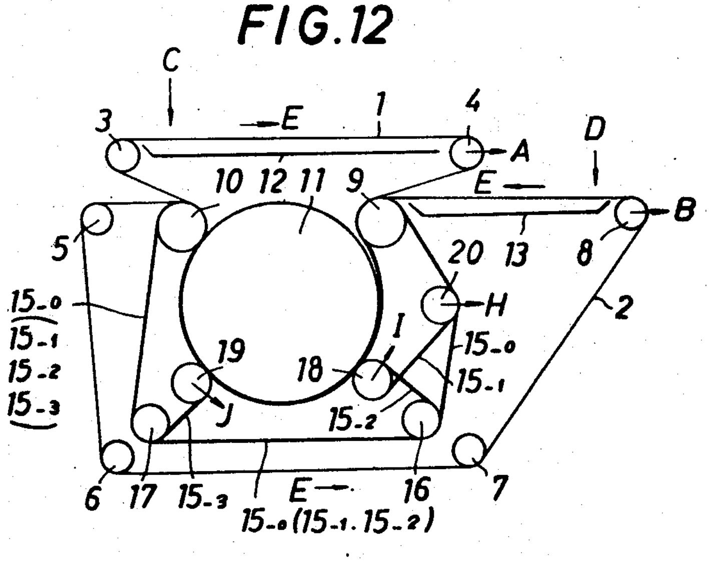
Figure 14:
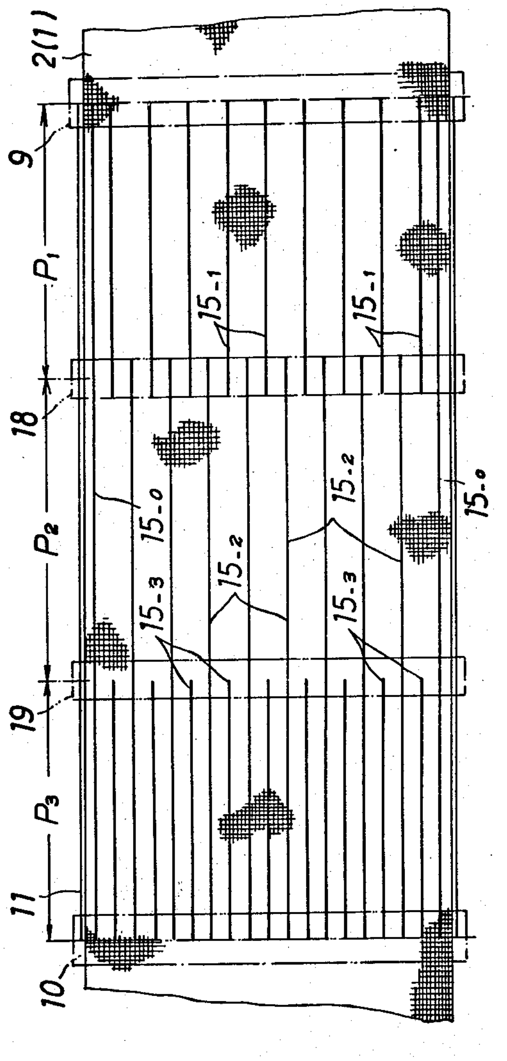

FIGS. *2a–2e* are side views showing two endless belts encircling the drum and three pressing belts, individually taken from FIG. 1;

FIG. 3 is a development of the portion of the apparatus in which the endless belt means and individual pressure belts, as arranged in position around the drum, press sludge against the peripheral surface of the drum;

FIG. 4 is a sectional view taken on line IV—IV in FIG. 3;

FIG. 5 is a sectlional view taken on line V—V in FIG. 3;

FIG. 6 is a sectlional view taken on line VI—VI in FIG. 3;

FIG. 7 is a sectional view taken on line VII—VII in FIG. 3;

FIG. 8 is a partial cutaway section of the drum;

FIGS. 9–12 are side views showing schematically other forms of dehydrating apparatus according to this invention;

FIG. 13 is a schematic presentation in side view form of the two filter cloths encircling the drum and the four different press belts in the embodiment shown in FIG. 12, individually taken from FIG. 12; and FIG. 14 is a development of the portion of the apparatus (shown in FIG. 12) in which the endless belt means and individual pressure belts, as arranged in position around the drum, press sludge against the peripheral surface of the drum.

DESCRIPTION OF SPECIFIC EMBODIMENT

Referring now to the embodiment of the invention shown in FIGS. 1–8 inclusive, an upper endless belt 1 is trained around guide rolls 3 and 4 and a lower endess belt 2 is trained around guide rolls 5, 6, 7, 8, 9, and 10. Both belts are composed of water-permeable filter medium, and are held in contiguous relation, one over the other, for a part of their run. That portion of the two endless belts in which they are in contiguous relation, for a larger part of its length, encircles a drum 11 with which the upper endless belt 1 is in immediate contact. The shaft of the drum 11 is rotatably supported in suitable bearings (not shown) fixed in position. Of all the guide rolls 3 to 10 which guide the two endless belts 1 and 2, each of the guide rolls 3, 5, 6, 7, 9 and 10 is supported in suitable bearings (not shown) fixed in position, whereas the guide rolls 4 and 8 have their respective bearings (not shown) urged in the direction of arrows A and B in FIG. 1 so that the two endless belts 1 and 2 are given adequate tension.

In the dehydrating apparatus, there is provided a feeding section through which chemical-injected sludge is introduced into the apparatus at a location above the left side part of that portion of the upper endless belt 1 which extends around and between the guide rolls 3 and 4 (said location being indicated by arrow C) or at a location above the right side part of that portion of the lower endless belt 2 which extends around and between the guide rolls 8 and 9 (said location being indicated by arrow D), or at both of said two locations. The sludge fed on to the endless belts 1 and 2 of water-permeable material at said feeding locations C and/or D are filtered by gravity on and through the water-permeable endless belt 1 or 2, as the case may be, as the endless belts travel in the direction indicated by arrow E. Beneath the gravity filtration zone are provided pans 12 and 13 to receive liquids resulting from the filtration.

After passing the gravity filtration zone, the sludge is carried between the two endless belts 1 and 2 to the pressing zone where the two endless belts holding the sludge therebetween encircle the drum 11. For this purpose, it is so arranged that driving force is applied to the guide roll 10 to actuate the two endless belts 1 and 2 to travel in the direction indicated by arrow E so that said two endless belts encircle the drum 11 in contiguous relation while holding the sludge therebetween. In the apparatus of this invention, therefore, the guide roll 10 constitutes a driving roll. The drum 11, as above described, is rotatably supported so that it rotates as the endless belts 1 and 2 run along their path thereon.

In the above described form of belt press, when a certain tension is applied to the two endless belts 1 and 2 by the guide rolls 4 and 8, respectively, the sludge carried between the two endless belts 1 and 2 of water-permeable material are pressed and dehydrated by tension acting on the endless belt 2 in the pressing zone where the two endless belts 1 and 2 travel around the drum 11.

This invention is characterized in that when two endless belts, of the construction as above described, run along the outer periphery of the drum 11 while carrying sludge therebetween, pressure is exerted on the inner periphery of the lower endless belt 2 against the drum 11 in a manner as described below.

While it is generally known that pressure is exerted to a lower endless belt 2 of water-permeable material by means of a pressure belt, the arrangement according to this invention is such that the pressure belt means are composed of a plurality of V belts 15-0, 15-1, 15-2, and 15-3, which are trained around the following guide means respectively so that the tensioned V belts, via the outer periphery thereof, press the inner surface of the lower endless belt 2 against the drum 11.

The V-belts 15-0, 15-1, 15-2 and 15-3 are arranged in spaced apart relation in the traverse direction of the endless belt 2. Of all these V belts, two outermost V belts 15-0 and two centrally positioned V belts 15-1 are trained around guide rolls 9, 20, 16, 17, and 10, being in immediate contact with the endless belt 2 throughout that portion of their run which extends around and between the guide rolls 10 and 9. The V-belts 15-2, which extend over a smaller distance than the V-belts 15-0 and 15-1, are arranged in spaces defined by the V-belts 15-0 and 15-1 so that all the V belts are about equally spaced in the traverse direction of the endless belt 2. Said V belts 15-2 are trained around guide rolls 18, 16, 17 and 10, with that portion of their run which extends around and between the guide rolls 10 and 18 in immediate contact with the endless belt 2. Again, in the spaces defined by the V belts 15-0, 15-1 and 15-2 thus put in immediate contact with the endless belt 2 are disposed the V belts 15-3 trained around guide rolls 19, 17 and 10, with that portion of their run which extends around and between the guide rolls 10 and 19 in immediate contact with the endless belt 2.

For the purpose of guiding the V belts 15-0, 15-1, 15-2 and 15-3, the guide rolls 9, 10, 16, 17, 18 and 19 are provided at suitable peripheral positions thereon with V grooves adapted to engage said V belts. With particular reference to the guide roll 10, it is arranged that the peripheral surface thereof other than the portions defining V grooves come in immediate contact with the endless belt 2 of water permeable material and press it against the drum 11 to dewater sludge S carried between the two endless belts 1 and 2. Thus, it is also a function of the guide roll 10 to serve as a press roll, for which purpose said guide roll 10 has its shaft rotatably supported in position.

In order to exert the desired tension on said pressing belt means comprising V belts 15-0, 15-1, 15-2, 15-3, the individual bearing means for the guide rolls 20, 18, 19 are flexibly urged by suitable take up means (not shown) in the directions indicated by arrows H, I, and J, respectively. The V belts 15-0, 15-1 extend around the drum 11 between the guide rolls 9 and 10, the longest distance of run, with their respective surfaces in immediate contact with the endless belt 2. The V belts 15-2 extend around the drum 11 between the guide rolls 18 and 10, the second longest distance of run, with their respective surfaces in immediate contact with the endless belt 2. Again, the V belts 15-3 travel on the drum 11 between the guide rolls 19 and 10, the shortest distance of run, with their respective surfaces in immediate contact with the endless belt 2. This relationship will be clearly understood from the fragmentary side views illustrating individual V belts 15-0, 15-1, 15-2, 15-3 arranged in position (FIG. 2), and from the development shown in FIG. 3. In this embodiment, as the sludge S carried between the two endless belts 1, 2 advance in the pressing and dehydrating zone formed around the drum 11 between the guide rolls 9 and 10, that is, from the first pressing zone P1, wherein only V belts 15-0, 15-1 are in immediate contact with the water permeable endless belt 2, to the second pressing zone P2, wherein additional V belts 15-2 are disposed in the spaces defined by and between the V-belts 15-0 and 15-1, and then to the third pressing zone P3, wherein further additional V belts 15-3 are disposed in the spaces defined by and between the V belts 15-0, 15-1, 15-3, said sludge S is subjected to pressure at progressively increased rates. In short, the number of points and area subject to pressure increase with the advance of travel in the pressing and dehydrating zone, i.e., in the order of pressing zones P1, P2 and P3.

More concretely, at the first pressing zone P1, the sludge S carried between the two endless belts 1 and 2 of water permeable material is prevented from being forced out sideways from between the endless belts by means of the two outermost V belts 15-0 which function as sealing means, and at same time, said sludge S is pressed at points adjacent the center of the endless belt means by the centrally positioned V belts 15-1 without adverse effect upon said sealing function of the V belts 15-0.

At the second pressing zone P2, the sludge is subjected to pressure from the V belts 15-2 at points other than those subjected to pressing at the first pressing zone P1, in addition to continued pressing by the V belts 15-0 and 15-1. Further, at the third pressing zone P3, pressure from the V belts 15-3 which act upon points other than those subjected to pressing at the preceding pressing zones is added to continued pressure from the V belts 15-0, 15-1, 15-2. It is desirable that at the third pressing zone P3, the V belts 15-0, 15-1, 15-2, 15-3 should be arranged in closely spaced apart relation so that each clearance $\beta$ between the individual V belts is smaller than the width $\alpha$ of each said V belt.

At the end of the dehydrating process, the resulting cake is discharged at a location indicated by arrow K, from where the two endless belts 1 and 2 are guided to travel in divergent directions.

While in the apparatus of above described form the two endless belts 1, 2 are of water permeable filtering medium, it is to be understood that only the endless belt 2, the one encircling the drum 11 on the outside of the other, may be of water permeable material. In this case, there may be provided only one sludge-feeding point at location D.

Where the two endless belts 1, 2 are made of water permeable filter medium as in the case of the embodiment described above, it is possible to obtain better filtration results by providing the drum 11 with the following arrangements. As illustrated in FIG. 8, the peripheral surface **11*b* of the drum 11 which the endless belt 1 encircles is made of a porous plate of perforated metal, and more preferably a bushing 23 of suitable height is provided at each punch hole 22 in such a manner that it protrudes inwardly from the inner peripheral surface 11*a* to define a guide outlet for inward discharge of filtrates into the drum 11**.

In the drum 11 constructed of such porous plate, filtrates which are removed from sludges S as they are pressed in the course of their travel through the pressing zones P1–P3 are directed through said punch hole 22 toward the inner periphery of the drum 11 as soon as they are discharged through the water-permeable endless belt 1 onto the surface of the drum 11. The filtrates are directed sideward across the inner peripheral surface **11*a* of the drum 11** to be discharged.

Such inwardly protruding bushing 23 provided at each punch hole 22 prevents filtrates (which have been discharged through the punch hole 22 by pressure from the pressure belts 15-0, 15-1, 15-2, 15-3 and guide rolls 9, 18, 19, 10) from flowing back through the punch hole 22 toward the sludges and aids in obtaining satisfactory dehydration results.

Provision of tapers (not shown) over the inner periphery **11*a* of the drum 11 is also desirable wherever punch holes 22 are present over the outer periphery thereof. Such tapers assure speedy removal from the bottom of inner periphery 11*a* of the drum 11 of the filtrates introduced through the punch holes 22** into the drum.

As sludges are pressed by the pressure belts immediately contacting the lower endless belt 2 of water permeable material, filtrates ooze out through the endless belt 2 toward edges of the pressure belts of the form as already described, namely, V belts 15-0, 15-1, 15-2, 15-3, have the advantage that the pressing force thereof is exerted to the water-permeable endless belt 2 or filter means, in such a manner that they do not bite into the filter means because the endless belt 2 is pressed by the back or broader side of each V belt. Moreover, the V belt arrangement permits filtrates to flow down along the bevels of each V belt reasonably fast. Accordingly, efficiency of filtrate removal is improved throughout the entire pressing zone, including the final end released of pressure from the press belts.

Figure 9:
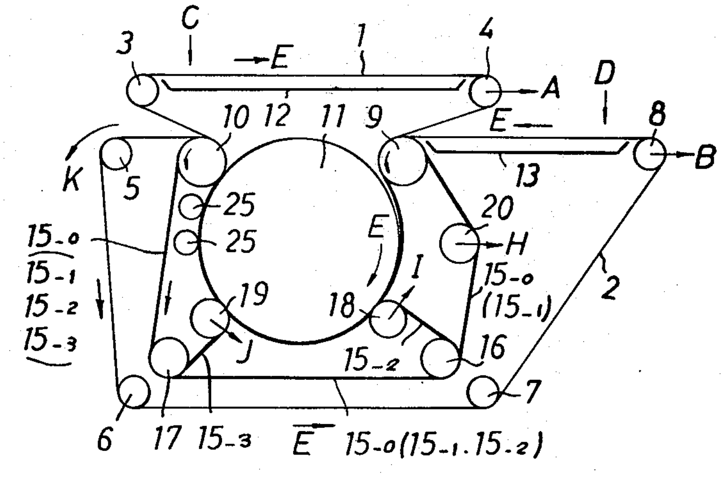
Figure 2B:
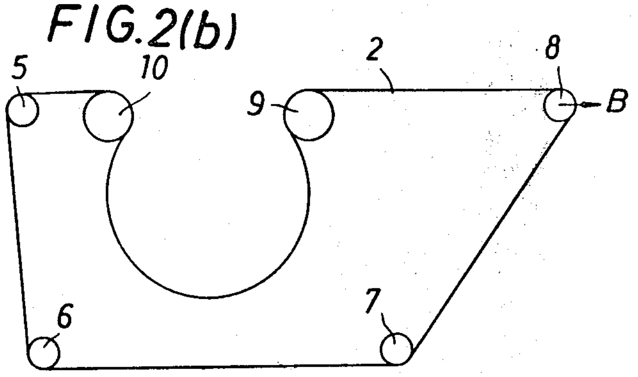
Figure 2A:
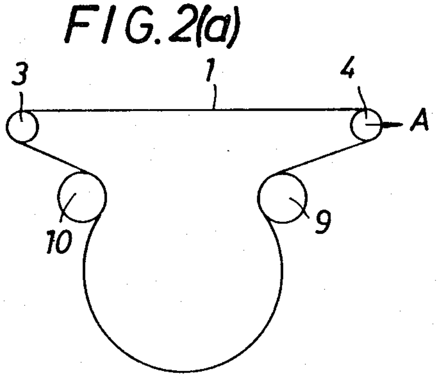
Figure 2C:
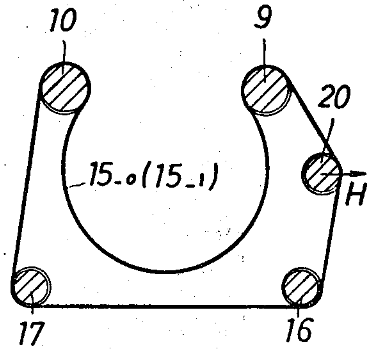
Figure 2D:
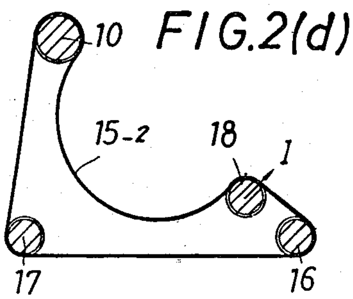
Figure 2E:
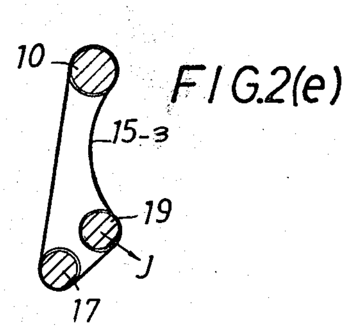

In the above described form of this invention, pressure exerted by the V belts 15-0, 15-1 (more particularly 15-1) on sludge S toward the center of the drum 11 is greatest at a point intermediate between guide rolls 9 and 10; pressure exerted likewise by the V-belts 15-2 is greatest at a point intermediate between the guide rolls 18 and 10 (which corresponds to the location of the guide roll 19); and pressure exerted likewise by the V belts 15-3 is greatest at a point intermediate between the guide rolls 19 and 10. In another embodiment of the invention, therefore, one or more pressure rolls 25, as shown in FIG. 9, may be provided between the guide rolls 19 and 10 and in immediate contact relation with the V belts 15-0, 15-1, 15-2, 15-3 to effect stronger pressure at more points. Or, a flat belt (not shown) may be trained around such rolls 25, 25 in immediate contact relation with the individual V belts to press the V belts more strongly toward the drum 11.

In still another embodiment, it is of course possible to arrange so that pressing by means of pressure belts is effected at more stages.

In the above described embodiment, the numbers of pressure belts exerting pressure at three pressing zones P1, P2, P3 are shown as 2 for V belt 15-1, 6 for V belt 15-2, and 9 for V belt 15-2 respectively, but it is to be understood that said numbers are only illustrative and not restrictive. As can be seen from what has been described above, in any form of apparatus according to this invention, it is desirable that the number of V belts 15-1, 15-2, 15-3 is so arranged as to increase progressively as pressing operation proceeds from pressing zone P1 to P2 and then to P3, and that pressing force from such V belts becomes greater as pressing operation progresses from one stage to another. The position and number of each individual V belt 15-1, 15-2, 15-3 in traverse direction relative to the endless belt 2 may be suitably selected according to the dehydratability of the sludge S to be dewatered.

Figure 10:
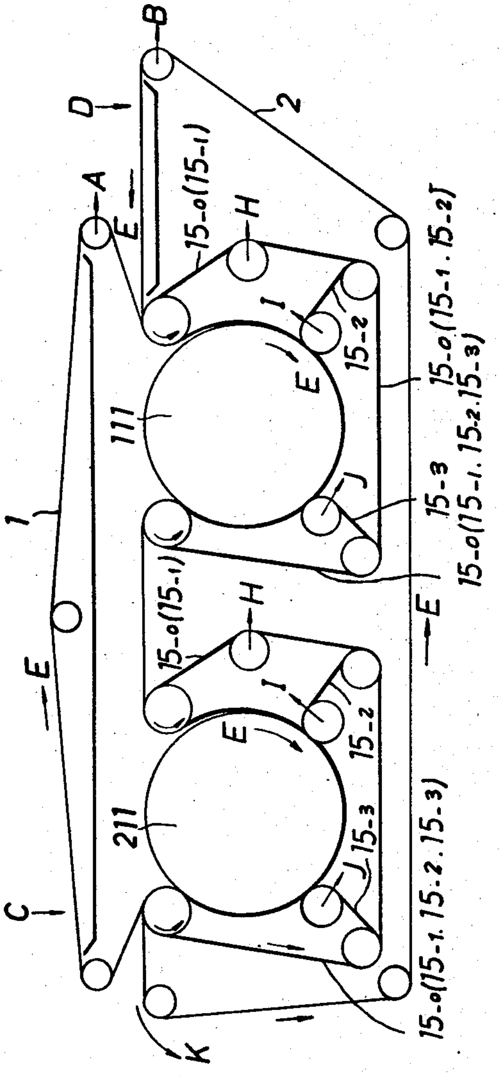
Figure 11:
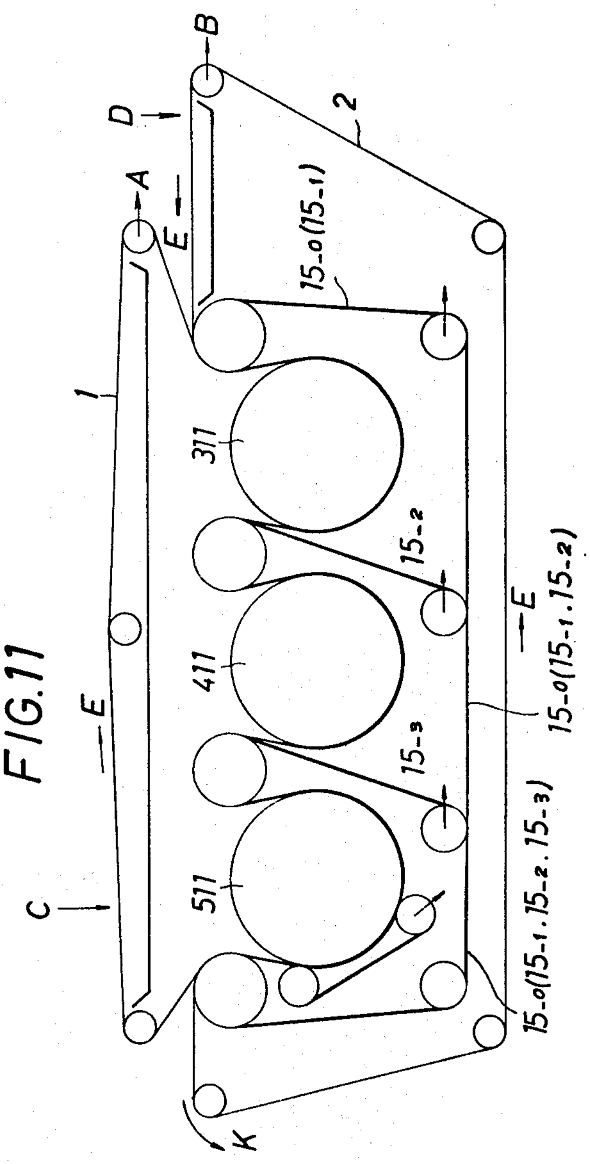
Figure 13A:
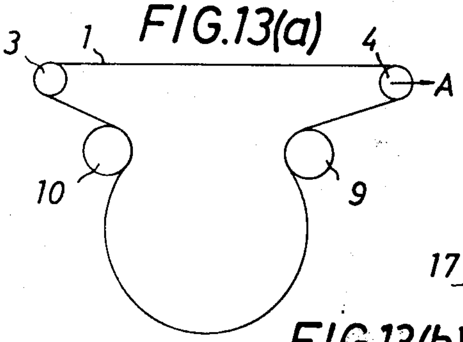
Figure 13C:
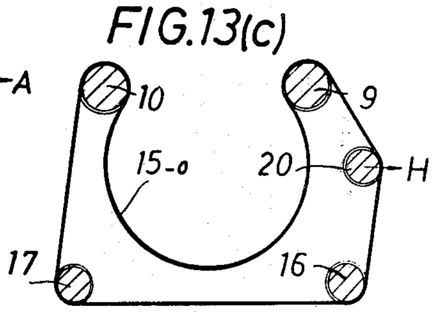
Figure 13B:
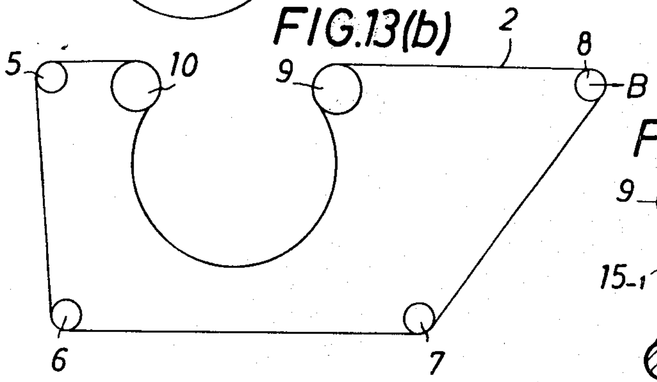
Figure 13B:
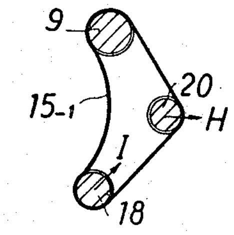
Figure 13D:
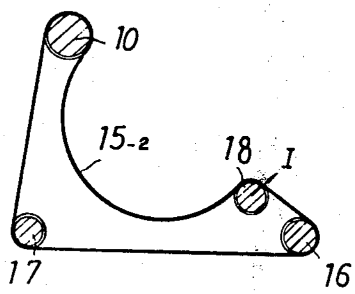
Figure 13E:
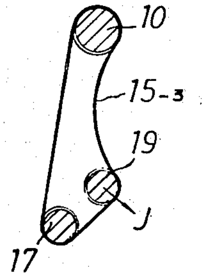

If the dehydratability of the sludge is poor, there may be provided, as shown in FIG. 10 as another form of the invention, a plurality of drums (two in this case), instead of one, arranged in line, one with the other, so that the same pressing operation as above described is carried out two times in succession around said two drums 111 and 211. As still another form of the invention, it may be arranged so that pressing operation is carried out in a longer pressing zone having a plurality of drums (three in this case) arranged in line, one with the other, as shown in FIG. 11, in such a manner that V belts 15-2, 15-3 are added between the V belts 15-0 and 15-1 on a step by step basis as operation (around the three drums 311, 411, 511) progresses from one stage to another, all said V belts 15-0, 15-1, 15-2, 15-3 being in direct contact relation with the endless belt 2.

In all the above described embodiments, individual pressure belts are increased in number with the progress of pressing operation from one zone to another. As a further diffferent form of the invention, it is possible to arrange that pressing by means of a plurality of pressure belts is effected at positions varied in traverse direction as operation progresses from one stage to another, instead of pressure being added progressively, stage after stage. In a still further different form, the arrangement may be that in earlier stages of the pressing zone, pressing by means of a plurality of pressing belts is carried out at positions (traversely spaced apart) as varied from stage to stage, whereas in later stage additional pressing belts are employed at different positions (traversely spaced apart) to exert additional pressing pressure. Such another form of apparatus embodying the invention is shown in FIGS. 12 to 14, inclusive.

The difference of the form of apparatus shown in FIGS. 12 to 14 from the one shown in FIGS. 1 to 3 is that, as can be readily seen from the figures, at the first pressing zone P1 V belts 15-1 are trained around guide rolls 9, 20, 18, while at the second pressing zone P2, V belts 15-2 are trained at positions different from those of the V belts 15-1, all said pressing positions being arranged in traversely spaced apart relation. Between the end of the second pressing zone P2 and the end of the third pressing zone P3 are trained V belts 15-3 in addition to the V belts 2. This last point is same as in the case of the first embodiment described in detail earlier.

The method and apparatus of this invention has now been described with reference to some embodiments. As will be readily understood from what has been described, in the method and apparatus of this invention, sludge carried between two endless belts is dehydrated by subjecting the sludge to progressively increased pressing pressure around the drum about which the two endless belts carrying the sludge between them travel while changing the pressing positions of the pressure belts relative to the sludge on a step by step basis. At early stage of the pressing zone, pressure is applied to limited portions of the high-moisture-containing sludge being treated, in other words, the water permeable, outer endless belt is pressed by pressing belts without being substantially covered thereby and in a reasonably water-penetrable way, so that maximum possible filtration of water expressed is obtained through the portions of the endless belt which are not covered by the pressing belts. Thus, early-stage dehydration is carried out at a comparatively low water-penetration pressure which is less likely to cause clogging of meshes of the water-permeable endless belt. At subsequent stages of the pressing zone, the sludge whose moisture content has now been reduced to some extent is further dehydrated by being subjected to pressing at different positions, or at more close spaced positions (different positions added to same positions as at an earlier stage). Therefore, throughout all stages of pressing operation, filtration can be carried out at reasonably equalized flow rates without causing mesh clogging, thus satisfactory dehydration results being smoothly attainable.

Unlike prior art methods, the method according to this invention does not involve substantial pressure being exerted on sludge all over across the endless belts at an early stage of pressing by means of a pressure belt. Therefore, it eliminates the possiblity of excessive mesh clogging at an early stage of the pressing operation which would result in decreased operation efficiency at subsequent pressing stages.

According to this invention, pressing pressure is exerted on the portion of the outer endless belt which surrounds the drum by means of a plurality of pressure belts at various different positions, said positions being changeable with or without additions. As earlier stated, the point at which maximum pressing pressure is exerted by the tension of a pressure belt differs between individual pressure belts and also between pressing stages. With this fact in mind, it is possible to suitably change or add positions at which the sludge is to be subjected to compression from stage to stage. It is also possible to change pressing pressure alternately in the direction of drum rotation as well. Possibilities of any unreasonable pressure being abruptly exerted on sludges are eliminated. Thus, very smooth dehydrating operation can be assured.

I claim:

1. In an apparatus for dehydrating sludge wherein at least one of the two endless belts, each trained around a plurality of rolls, is of water permeable filter medium, sludge feeding means is provided at the beginning of a path of travel of said two endless belts which are caused to run along said path of travel in contiguous relation with each other, said sludge feeding means being adapted to permit sludge to be carried between said two endless belts, and a drum supported in suitable bearings and a pressure belt trained around a plurality of rolls are provided to press said two endless belts in cooperation with one another in their path of travel around the drum, said drum being in immediate contact with one of said two endless belts, said pressure belt being in immediate contact with the other of said two endless belts, the improvement comprising: said pressure belt being composed of a multiplicity of belt strips arranged in spaced relationship perpendicular to the movement of said two endless belts such that said belt strips do not overlap, said multiple belt strips being positioned along the path of the travel of said two endless belts and in contiguous relation therewith so as to cover any suitable number of stages into which said path of travel is divided.

2. The apparatus as set forth in claim 1, wherein of said multiplicity of pressure belt strips arranged in perpendicularly spaced relation, at least a plurality of pressure belt strips including the outermost strips are in immediate contact relation with one of the endless belts in the early stage of the path of travel of the endless belts and the other pressure belt strips are in immediate contact relation with said one of the endless belts.

3. The apparatus as set forth in claim 1 or claim 2, wherein said pressure belt is arranged in contiguous relation with the endless belts in such a manner that the arrangement of perpendicularly spaced positions of its constituent strip members differs from stage to stage.

4. The apparatus as set forth in claim 1 or claim 2, wherein said pressure belt is arranged in contiguous relation with the endless belts in such a manner that its perpendicularly spaced strip members increase in number, step by step, as said pressure belt run into a later stage of the path.

5. The apparatus as set forth in claim 1 or claim 2, wherein said pressure belt is arranged in contiguous relation with the endless belts in such a manner that in early stage of the path of the endless belts, the arrangement of perpendicularly spaced positions of its constitutent strip members differ from step to step and in later stages of the path its perpendicularly spaced strip members increase in number, step by step.

6. The apparatus as set forth in any of claims 1-5, wherein a plurality of drums are incorporated.

7. The apparatus as set forth in any of claims 1-6, wherein the endless belt with which said pressure belt is in contact is of water-permeable filter medium.

8. The apparatus as set forth in any of claims 1-6, wherein said pair of endless belts are both of water-permeable filter medium.

9. The apparatus as set forth in any of claims 1-8, wherein the individual pressure belts constituting said multiple-strip pressure belt are V belts.

10. The apparatus as set forth in any of claims 1-9, wherein said drum is constructed of porous plate of punching metal form.

11. The apparatus as set forth in claim 10, wherein said drum is constructed of porous plate of punching metal form and at each punch hole there is provided a bushing of suitable height protruding inwardly from the inner peripheral surface, said bushing constituting a guiding port for discharge of filtrates into the drum.

12. The apparatus as set forth in claim 11, wherein the inner periphery of the drum has tapers.

13. The apparatus as set forth in claim 10, wherein the inner periphery of the drum has tapers.

* * * * *